United States Patent
Ramfelt et al.

[11] Patent Number: 5,946,315
[45] Date of Patent: Aug. 31, 1999

[54] METHOD AND DEVICE FOR SYNCHRONIZING DYNAMIC SYNCHRONOUS TRANSFER MODE IN A RING TOPOLOGY

[75] Inventors: Lars Håkan Ramfelt, Palo Alto, Calif.; Lars Markus Hidell, Lidingö, Sweden

[73] Assignee: Dynarc Inc., Mountain View, Calif.

[21] Appl. No.: 09/058,720

[22] Filed: Apr. 10, 1998

Related U.S. Application Data

[63] Continuation-in-part of application No. 08/757,347, Nov. 27, 1996, Pat. No. 5,838,687.

[30] Foreign Application Priority Data

Dec. 28, 1995 [SE] Sweden ................................ 9504679

[51] Int. Cl.$^6$ .............................. H04L 12/28; H04L 12/56
[52] U.S. Cl. ......................... 370/403; 370/404; 370/405; 370/406
[58] Field of Search ................................ 370/403, 406, 370/412, 413, 442, 443, 452, 458, 460, 909, 352, 428, 353, 468, 328, 329, 341, 394, 415, 417, 420, 423, 424, 429, 440, 449, 451

[56] References Cited

U.S. PATENT DOCUMENTS

| | | | |
|---|---|---|---|
| 4,553,234 | 11/1985 | Brandsma et al. | 370/458 |
| 4,815,071 | 3/1989 | Shimizu | 370/352 |
| 4,817,088 | 3/1989 | Adams | 370/458 |
| 4,926,418 | 5/1990 | Cidon et al. | 370/455 |
| 5,297,139 | 3/1994 | Okura et al. | 370/428 |
| 5,327,428 | 7/1994 | Van As et al. | 370/458 |
| 5,502,817 | 3/1996 | Krone et al. | 370/403 |
| 5,526,356 | 6/1996 | Kim et al. | 370/403 |
| 5,544,163 | 8/1996 | Madonna | 370/352 |
| 5,654,969 | 8/1997 | Wilhelmsson | 370/460 |

FOREIGN PATENT DOCUMENTS 0 451 426 B1  2/1994  European Pat. Off. .

OTHER PUBLICATIONS

The DTM Gigabit Network by Christer Bohm, Per Lindgren, Lars Ramfelt, Peter Sjodin; dated Jun. 17, 1993; pp. 1–20, 22–23.

Fast Circuit Switching for the Next Generation of High Performance Networks; *IEEE Journal on Selected Areas in Communications,* vol. 14, No. 2, Feb. 1996, by Christer Bohm, Markus Hidell, Per Lindgren, Lars Ramfelt, and Peter Sjödin; pp. 298–305.

Multi–gigabit networking based on DTM—A TDM medium access technique with dynamic bandwidth–allocation; *Computer Networks and ISDN Systems* 24 (1992) 119–130 North–Holland; by Lars Gauffin, Lars Håkansson and Björn Pehrson; pp. 119–130.

Incorporating continuation–of–message information, slot reuse, and fairness in DQDB networks; *Computer Networks and ISDN Systems* 24 (1992) 153–169 North Holland; by Subrata Banerjee and Biswanath Mukherjee; pp. 153–169.

MetaRing—A Full–Duplex Ring with Fairness and Spatial Reuse; *IEEE Transactions on Communications,* vol. 41, No. 1, Jan. 1993; by Israel Cidon and Yoram Ofek; pp. 110–120.

(List continued on next page.)

*Primary Examiner*—Dang Ton
*Assistant Examiner*—Phirin Sam
*Attorney, Agent, or Firm*—Fasth Law Offices; Rolf Fasth

[57] ABSTRACT

Idle messages are transmitted by an expansion node into the ring topology until the first idle message arrives to the expansion node after having passed through the entire ring. Frames may then be transmitted by the expansion node at every cycle time. The expansion node has an expansion buffer that may receive incoming frames and stores the frames until the next cycle time. The frame stored in the buffer may then be transferred to transmission side of the expansion node and transmitted into the ring topology. If there is no frame stored in the buffer at the beginning of a new cycle time, the expansion node may generate a new frame and transmit the new frame into the ring topology.

13 Claims, 3 Drawing Sheets

OTHER PUBLICATIONS

A Simple Scheme for Slot Reuse Without Latency for a Dual Bus Configuration; by Oran Sharon and Adrian Segall, 1993 IEEE, 9 pages.

A Study of Slot Reuse in Dual Bus Multiple Access Networks by Mark W. Garrett and San–Qi Li; 1990 IEEE, pp. 617–629.

L. Ramfelt; by Manoel A. Rodrigues, AT&T Bell Laboratories, Holmdel, NJ 07733; 1990 IEEE; pp. 636–643.

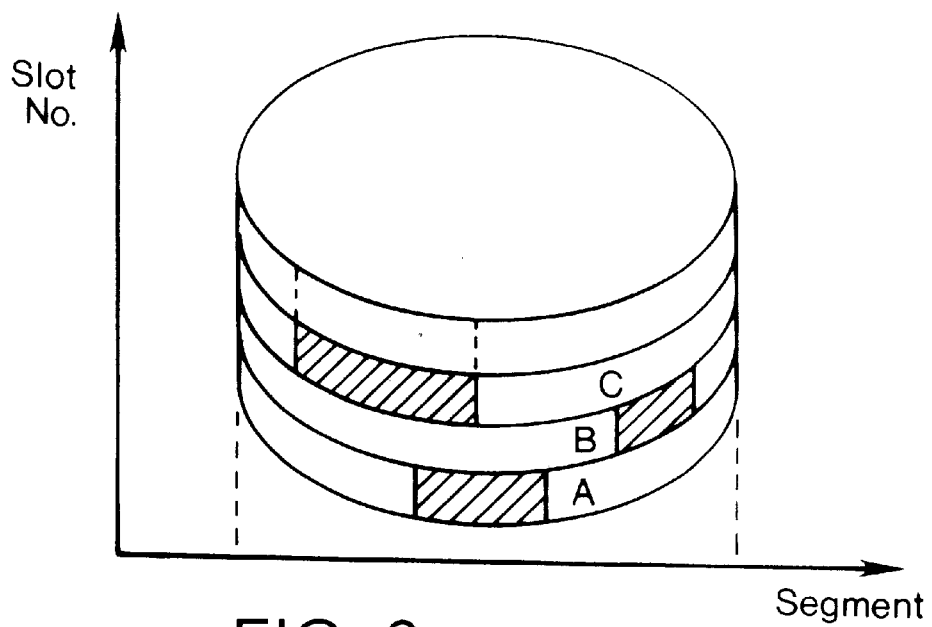
FIG. 6
FIG. 7
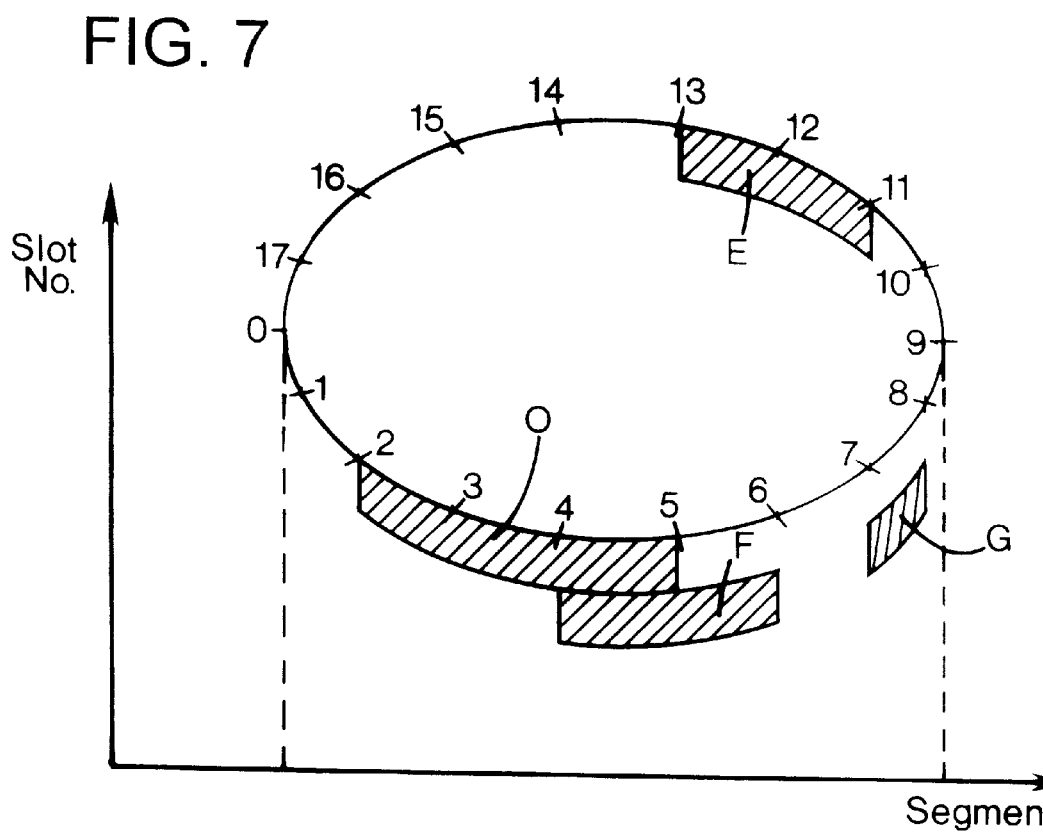

METHOD AND DEVICE FOR SYNCHRONIZING DYNAMIC SYNCHRONOUS TRANSFER MODE IN A RING TOPOLOGY

PRIOR APPLICATION

This application is a continuation-in-part application of U.S. patent application Ser. No. 08/757,347; filed Nov. 27, 1996 and claims priority of Swedish Patent Application No. 9504679-3; filed Dec. 28, 1995. U.S. patent application Ser. No. 08/757,347 issued as U.S. Pat. No. 5,838,687 on Nov. 17, 1998.

TECHNICAL FIELD

The present invention relates to the synchronization of a dynamic synchronous transfer mode (DTM) architecture in a circuit-switched network having a ring topology.

BACKGROUND AND SUMMARY OF THE INVENTION

The next generation of networks are likely to integrate services such as delay-insensitive asynchronous applications including fax, mail, and file transfer with delay-sensitive applications having real-time requirements including audio and video. These applications have traditionally been supported by different network technologies and the integration between the different networks have been limited and cumbersome. In the past, asynchronous communication has been provided by computer networks that are packet-switched and use store-and-forward techniques, like the Internet. Real-time synchronous communication, on the other hand, has been provided by circuit switched, time-division multiplexed telephone networks.

Circuit-switched networks have many attractive features. For example, the circuits are isolated from one another in the sense that traffic on one circuit is unaffected by activities on the other circuits. This makes it possible to provide guaranteed transfer quality with constant delay which often is suitable for applications with timing requirements. Furthermore, information that is related to data and control are separated in circuit-switched networks. Processing of control information only takes place when circuits are created or terminated and the actual data transfer can be performed without the need for processing the data stream and controlling any congestion. This allows large volumes of data to be transferred efficiently.

The static nature of ordinary circuit-switched networks often makes them inappropriate for certain types of information flows. Traditionally, the circuits have fixed capacity, long set-up delay and poor support for multi-cast. These shortcomings make it difficult to efficiently support, for example, computer communication in a circuit-switched network. This has motivated a search for alternative solutions and the predominant view is that the next generation of telecommunication networks should be cell-switched based on asynchronous transfer mode (ATM). Cells are small, fixed-size packets, so ATM is similar to packet-switching. This means that many of the weaknesses of packet-switching are also present in cell-switched networks, particularly in the area of providing guaranteed quality of service. Therefore, additional mechanisms, such as admission control, traffic regulation, scheduling of packets on links and resynchronization at the receiver are needed to integrate support for different kinds of information flows. One of the main concerns with packet and cell switched networks in general, and ATM in particular, is whether it is possible to provide and use these mechanisms in a cost-effective way.

Shared medium local area networks (LANs), such as CSMA/CD, token ring and FDDI, are used in the Internet as building blocks connected by routers or bridges. The combination of easy expansion, low incremental node cost and tolerance to faulty nodes has resulted in simple, flexible, and robust networks. Also, the shared medium facilitates an efficient application of new multi-cast protocols such as IP multi-cast.

A drawback of the shared medium that is used today is that it typically permits only a single terminal to transmit at any time, thereby not utilizing all network segments efficiently. A design that allows the capacity of the medium to be reused may be designed, but this is often at the cost of increased complexity in the high-speed access control hardware. Access control mechanisms for a shared medium also directly depend on the size of the network and are usually efficient only for local area environments.

As indicated earlier, the two main types of networks commonly used are connection oriented circuit-switched networks used for telephones and packet-switched networks without connections that are used for computers, as exemplified by the Internet. When a circuit-switched network is used for data communication, the circuits must remain open between bursts of information which is often a poor use of the network capacity. This problem arises because circuit management operations are slow compared to the dynamic variations in the user demand. Another source of overhead in conventional circuit-switched networks is the limitation of requiring symmetrical duplex channels which add 100% overhead to the network when the information flow is unidirectional. This constraint also makes multi-cast circuits inefficient and difficult to implement. Packet-switched networks, on the other hand, lack resource reservation and must add header information to each message before the transmission is made. Furthermore, any latency in the packet-switched networks cannot be accurately predicted and packets may even be lost due to buffer overflow or corrupted headers. The latter two factors make real-time service difficult to support in packet-switched networks. Congestion avoidance mechanisms can isolate information streams of different users. These designs are, however, limited to time scale operations that are comparable to the round-trip packet delay.

DTM is a broadband network architecture that combines many of the advantages of circuit-switching and packet-switching in that DTM is based on fast circuit-switching augmented with a dynamic reallocation of resources, good support for multi-cast channels and DTM has means for providing short access delay. The DTM architecture spans from medium access, including a synchronization scheme, up to routing and addressing of logical ports at the receiver. DTM is designed to support various types of information flows and can be used directly for application-to-application communication, or as a carrier network for other protocols such as ATM or IP (The Internet Protocol).

It has been shown that the signaling delay associated with the creation and termination of communication channels determines much of the efficiency of fast circuit-switching. DTM is designed to create channels fast, within a few hundreds of microseconds. DTM differs from burst switching in that information related to control and data are separated and DTM uses multi-cast, multi-rate, high capacity channels to support a variety of different classes of information flows. For example, it is possible to increase or decrease the allocated resources of an existing channel depending on the particular requirements of the user at the time. Even though a DTM network may have the potential of creating a channel for every message, this approach may not be suitable for all information flows. Rather, it is up to the user to decide whether to establish a channel per information burst or to keep the channel established even during idle periods.

The DTM concept uses channels as the communication abstraction. The DTM channels differ from telephone circuits in many ways. First, the establishment delay is short so that resources can be allocated/deallocated dynamically as fast as user requirements change. Second, the DTM channels are simplex to minimize the overhead when the communication is unidirectional. Third, the DTM channels offer multiple bit-rates to support large variations in user capacity requirements. Finally, the DTM channels are multi-cast to allow any number of destinations.

The DTM channels require no transfer or control information after a channel is established resulting in a very high utilization of network resources for large data transfers. The support of any real-time information flow is effective and there is no problems related to policing, congestion control or flow-control within the network. As mentioned earlier, the control information is separated from the data information which makes multi-cast less complex. The transmission delay is negligible (i.e., less than 125 $\mu$s) and there is virtually no potential for data loss caused by buffer overflow as in ATM. Bit-error rates depend on the underlying link technologies, and switches are simple and fast due to the strict reservation of resources at the channel setup.

The DTM topology may be structured as a ring which has the advantage of reducing the hardware requirement with 50% compared to dual bus structures. All nodes are able to communicate with each other on a ring topology by using only one optical fiber in contrast to a bus structure that always require at least two fibers in opposite direction to enable all the nodes to communicate with each other. Additionally, the load on each node in the bus structure may be unevenly distributed.

More particularly, the present invention is a single DTM ring topology having at least one expansion node including a FIFO queue. The present invention is also a method that comprises the steps of first transmitting idle messages into the ring topology until the first idle message arrives to the expansion node after having passed through the entire ring. Frames are then transmitted by the expansion node with a frequency corresponding to the cycle time. The expansion node has an expansion buffer that may receive incoming frames and store the frames until the next cycle start time. The frame stored in the buffer is then transmitted into the ring topology. If there is no frame stored in the buffer at the beginning of a new cycle time, the expansion node will generate a new frame and transmit the new frame into the ring topology.

BRIEF DESCRIPTION OF THE DRAWINGS

FIG. 6 is a schematic view of a ring topology showing three separate channels; and FIG. 7 is a schematic view of the DTM ring topology of the present invention showing slot reuse of different segments.

DETAILED DESCRIPTION

Figure 1:
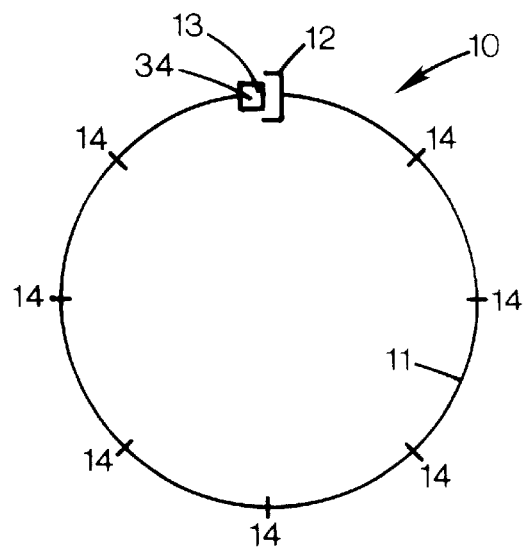
FIG. 1 is a schematic view of a DTM ring topology of the present invention.

With reference to FIGS. 1–7, the present invention is a dynamic synchronous transfer mode (DTM) ring topology 10 that has an effective length that is, preferably, an integer multiple of 125 microseconds long cycles wherein the ring topology comprises an expansion node 12 that may be used to precisely adjust the effective length of the ring topology 10 although the physical length of the ring topology is not an integer multiple of the cycle time, as explained in detail below. The total capacity of the ring topology 10 may be divided into cycles of 125 microseconds which are further dividable into 64-bit slots.

An important feature of the DTM ring topology 10 of the present invention is that the cycle time and the slot length are, preferably, constant throughout the DTM ring topology 10. The DTM ring topology 10 is designed for a unidirectional medium with multiple access such as a fiber optics medium 11 having a capacity that is shared by all the connected nodes. The expansion node 12 may include an expandable buffer segment such as a FIFO (first-in-first-out) queue 13 for storing frames consisting of time slots. The queue 13 permits a time expansion of the ring topology 10 to store frames in the queue 13 a suitable amount of time to optimize the use of the expansion node 12 by permitting the expansion node 12 to generate cycles periodically (every 125 microseconds) into the ring topology independent of the availability of any incoming cycles in the FIFO queue 13 at the transmission time of the new cycle. The FIFO queue 13 may be adapted to hold no more information than corresponding to one 125 microsecond cycle. In this way, it is possible to finish a cycle (or frame) that is transmitted by the expansion node 12 before the time slots of a frame stored in the queue 13 are passed to the transmitting side of the expansion node.

The function of the FIFO queue 13 is quite important to maintain the correct synchronization of all the cycles and time slots of the ring topology 10. For example, the cycle may be 125 microseconds long and the speed and the length of the ring topology 10 may be such that is takes 150 microseconds to pass through the entire ring topology 10.

Figure 5:
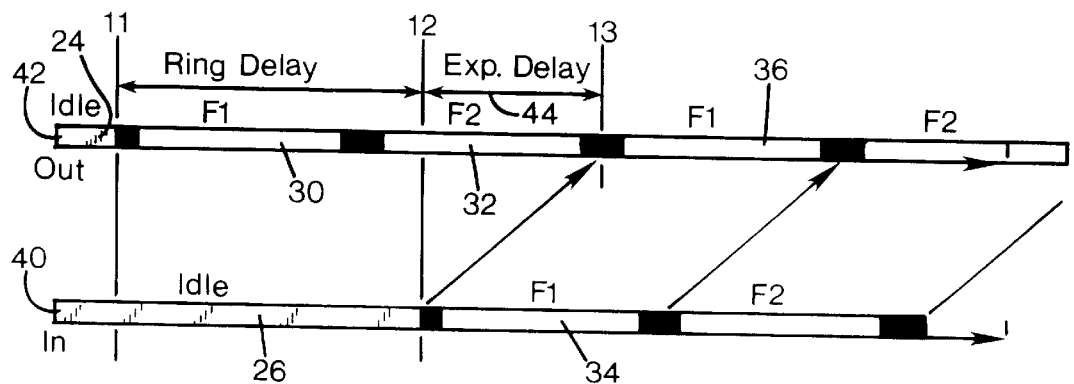
FIG. 5 is a schematic view of incoming and outgoing frames in the expansion node.

As best illustrated in FIG. 5, an aspect of the expansion node 12 is shown as having an incoming side 40 for receiving incoming frames and an outgoing side 42 for transmitting frames. The time t1 may represent the time a first slot of a first frame 30 is generated by the expansion node 12. The time t2 may represent the time it takes to pass through the entire ring topology 10 (150 microseconds) and the time t3 may represent the time a first slot of a third frame 36 is transmitted by the expansion node. The first frame 30 is about 125 microseconds long. The FIFO queue 13 may be used to delay an incoming frame 34 in the FIFO queue 13 to maintain the synchronization of the ring topology 10. In the above example, the FIFO queue 13 may delay the stored frame by 100 microseconds, as shown by the expected delay 44, which is the difference between t3 (250 microseconds) and t2 (150 microseconds). In this way, the total time around the ring topology 10 including the expected delay time is 250 microseconds which is an integer multiple of 2 of the cycle time 125 microseconds. In this way, the FIFO queue 13 may be used to delay the time between the arrival of the first slot of a frame and the time the first slot of the stored frame 32 is to be transmitted by the expansion node 12, as explained in detail below.

The physical length of the ring topology 10 may therefore be of any length and the FIFO queue makes sure that the total time including the delay time is synchronized as a multiple integer of the cycle time. The FIFO queue 13 may also be used to adjust for any variations of the length around the ring topology 10 that may occur due to changes in the temperature. The delay time in the FIFO queue 13 is preferably less than the cycle time of 125 microseconds.

It is to be understood that the length of the ring topology may be of any length and the 125 microseconds cycle length has been selected because it has become a standard in the telecommunication industry. For example, SDH/Sonet and QPSX are based on 125 microseconds long cycles. However, any suitable cycle time may be used as long as the cycle time is substantially constant so that the time slots are synchronized in every cycle generated by the nodes.

The ring topology 10 preferably has a plurality of regular nodes 14 and at least one of the nodes is selected as the expansion node 12. The method of selecting the expansion node 12 may be performed according to a suitable selection method such as selecting the node that has the highest or the lowest predetermined identification number. It is to be understood that the ring topology 10 may have a plurality of expansion nodes 12, if required.

Figure 2:
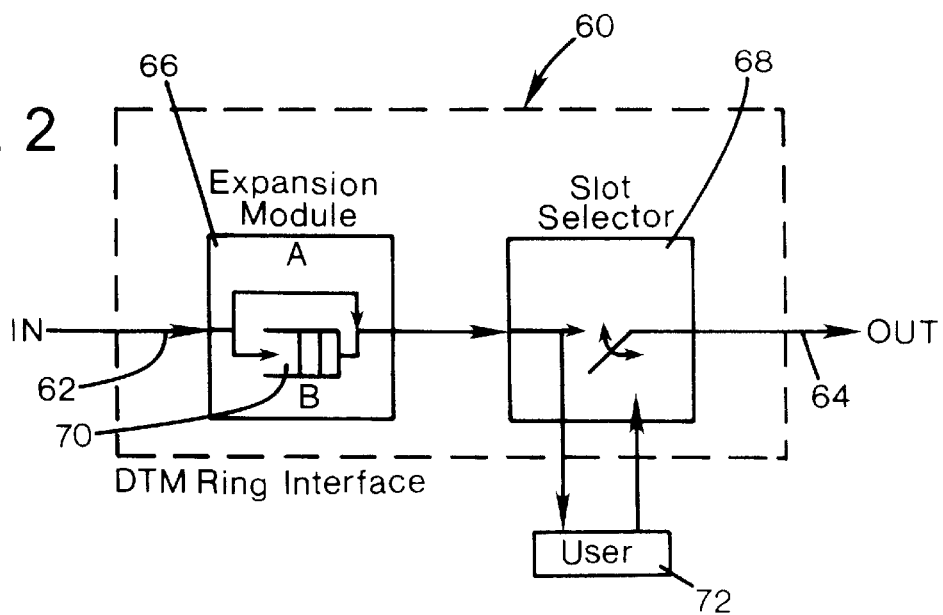
FIG. 2 is a detailed view of a node of the present invention.

FIG. 2 shows a detailed view of a node 60 having an end portion 62 for receiving incoming cycles and an opposite end portion 64 to transmitting cycles. All nodes, including expansion nodes and regular nodes, comprise two modules, i.e. an expansion module 66 and a slot selector 68, that are connected in series. If the node 60 is selected as the expansion node for the ring topology, then the node 60 preferably writes any incoming slots into a FIFO queue 70. If the node 60 is not an expansion node, then the node preferably forwards all slots (including frame slots and gap slots) immediately to the slot selector 68 without passing the slots via the FIFO queue 70. The slot selector 68 may copy the slots to a user 72 connected to the node 60. The slot selector 68 may also replace the slots in the frame independently of the expansion module 66 with information provided by the user 72.

In general, the service provided by the DTM ring topology 10 of the present invention is, preferably, based on channels. A channel may be defined as a set of time slots having a sender and an arbitrary number of receivers. The result is that it is guaranteed that the data will reach the receivers at the rate given by the capacity of the channel. The channels on the physically shared medium may be illustrated by the time division multiplexing (TDM) scheme (see FIG. 3). As indicated earlier, the total capacity of the fiber medium may be divided into cycles 16 having a length of 125 microseconds which are further divided into 64-bit slots 18. It is to be understood that other cycles and slot sizes may be used. The transmission medium can, in addition to optical fibers, be a coaxial cable or another medium with high capacity. In the description, the transmission medium will be referred to as an optical fiber.

Figure 3:
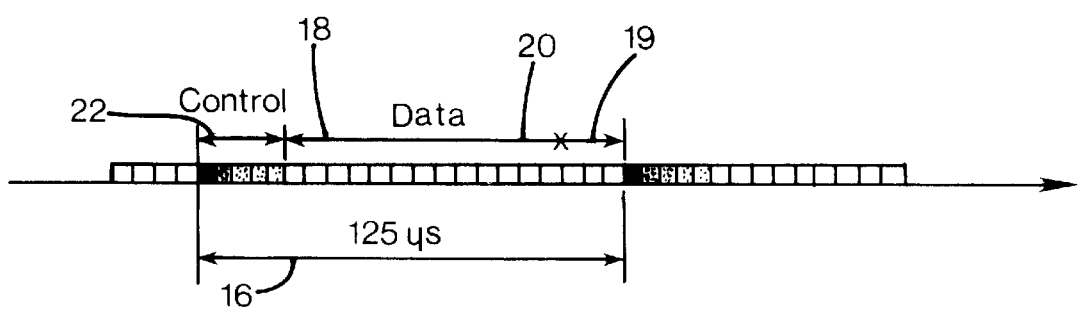
FIG. 3 is a schematic view of a DTM cycle of the present invention having the data time slots separated from the control time slots.

As best shown in FIG. 3, the active time slots (excluding a set of gap slots 19) are preferably separated into data slots 20 and control slots 22. As described in detail below, each node 14 has access to at least one control slot 22 which may be used for sending control information to the other nodes in the network. For example, control messages may be sent upon a request from a user and in response to control messages from other nodes or simultaneously for management purposes. The control slots 22 may constitute a small fraction of the total capacity while the major part of the slots are, preferably, data slots 20 for carrying payload.

Figure 4:
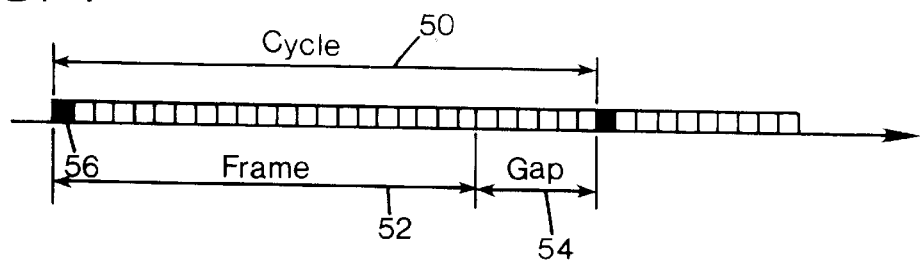
FIG. 4 is a schematic view of a DTM cycle including a frame and gap slots.

FIG. 4 illustrates the details of a complete time cycle 50 that may be defined as an integer number of time slots corresponding to about 125 microseconds. The cycle 50 may be divided into a frame 52 and gap slots 54. The frame 52 may be used to include data slots for carrying pay loads and control slots for carrying control and management messages. It is necessary to include the gap slots 54 in each cycle 50 because each node in the ring topology 10 may riot be perfectly synchronized to 125 microseconds and the gap slots 54 may be used to accommodate any variations between the nodes. The gap slots 54 are preferably never used to carry payloads but are only used as an adjustment mechanism. The number of gap slots 54 may be adjusted up or down a few slots so that the average cycle time is very close to 125 microseconds.

In the preferred embodiment, the frame 52 may also include a start slot 56 that is disposed in the beginning of the frame 52 to define the start of a new cycle. In this way, the frame 52 is a fixed number of slots that is slightly less than the total number of slots in the cycle 50.

Before any new cycles containing frames are generated by the expansion node 12, the expansion node 12 preferably first transmits a stream of idle messages 24 into the ring topology 10. The idle messages 24 may have several functions. For example, the idle messages 24 may be used to make sure that no random cycles, including useless and meaningless information, exist in the ring topology 10 before any frames are transmitted by waiting until it is confirmed that a first idle message 26 is returned to the expansion node 12. When the first idle message 26 is returned, the expansion node 12 knows that the ring topology 10 is free of any random cycles. The idle messages 24 may also be used to inform the nodes 14 in the ring topology 10 that the nodes 14 were not selected as the expansion node for the ring topology 10 and that the selection process of which node is to be the expansion node is completed.

The idle messages 24 may contain only zeros in every time slot or any other messages so that when the first idle message 26 is returned to the expansion node 12 after having passed through all the nodes 14 of the entire ring topology 10, the expansion node 12 is able to identify the contents of the incoming time slots as an idle message. It is to be understood that the idle messages 24 may include any type of information as long as the expansion node 12 is able to identify the incoming messages as idle messages 24. It is important that the expansion node 12 and the remaining nodes 14 in the ring topology 10 are able to distinguish the idle messages 24 from meaningful payload information.

As indicated above, the expansion node 12, preferably, does not generate and transmit the first frame 30 until at least the receipt of the first idle message 26 to the expansion node 12 is confirmed. In other words, the expansion node 12 keeps on generating idle messages 24 and waits until at least the first idle message 26 has passed through the entire ring topology 10 before the first frame 30 is generated. However, as long as no idle message have been returned to the expansion node 12, the expansion node 12 keeps on generating and transmitting idle messages 24 until the first idle message 26 arrives to the expansion node 12 so that all time slots in the entire ring topology 10 are eventually filled with idle messages 24 before the first frame 30 is transmitted into the ring topology 10. However, it is not necessary for the expansion node 12 to generate frames just because the first idle message 26 has arrived to the expansion node 12. The expansion node 12 may continue to generate idle message 24 until it is time to generate frames.

It is desirable to remove all the random cycles in the network with the idle messages 24 before the first frame 30 is transmitted because the random cycles are likely to have cycle times that are different from the cycle time used by the expansion node 12 and the nodes 14 and the random cycles could therefore adversely interfere with the synchronization of the entire ring topology 10.

Any random cycles that are returned to the expansion node 12 may be temporarily stored in the FIFO queue 13 and then removed from the expansion node 12. However, it is not necessary for any random cycles to be first stored in the FIFO queue 13 before the random cycles are permanently removed from the ring topology 10.

In the preferred embodiment, the expansion node 12 may be set up to only record any incoming information to the FIFO queue 13 that is not idle messages 24. In this way, the idle messages 24 never enter the FIFO queue 13 and are removed from the expansion node 12 as the idle message 24 arrive into the expansion node 12. This ensures that the FIFO queue 13 will eventually only contain pay load carrying frames.

When the expansion node 12 generates the first frame 30 into the ring topology 10, the FIFO queue 13 is preferably empty and there are still idle messages 24 moving around in the ring topology 10. When the first frame 30 arrives to the expansion node 12, the first frame 30 enters the FIFO queue 13 unless the first frame happens to arrive exactly at the start time of a new cycle when the expansion node 12 is ready to send out the next frame. Assuming that the first frame 30 arrives to the expansion node 12 at a time that is different from the start of a new cycle, the first frame 30 is stored in the FIFO queue 13 and becomes the first cycle in the FIFO queue 13. The first frame 30 preferably remains in the FIFO queue 13 until the start of the next cycle and the expansion node 12 is ready to transmit a new frame into the ring topology 10.

When the expansion node 12 is ready to transmit a second frame 32 into the ring topology 10 (i.e. at the beginning of the next cycle time that is exactly 125 microseconds after the first cycle time), the expansion node 12 may first determine if there is any information stored in the FIFO queue 13, that should be delivered to the local node (i.e., the expansion node). If the frame stored in the FIFO queue contains time slots that contain information that should be delivered to the local node, these time slots may be read before the frame is forwarded to the transmitting side of the node. In addition, the expansion node may fill the time slots with new information as the time slots are forwarded from the expansion FIFO to the transmitting side of the expansion node.

If there is a stored frame 34 available at the start of the next cycle, the expansion node 12 reads the stored frame 34 by going through each and every time slot of the stored frame 34 in the FIFO queue 13. For example, the expansion node 12 may start the reading process by reading slot 1 of the stored frame 34 and then move onto to slots 2, 3 etc. until the expansion node 12 reads the last slot of the stored frame 34. There is no need to mark the last slot at end of each frame because the cycle time and the slot length are constant and the expansion node 12 knows when the last slot of each message or cycle is read.

If the expansion node 12 has no new information to add to a particular time slot of, for example, the second frame 32, the information contained in the particular slot of the stored frame 34 may be forwarded. In other words, the default may be set so that the information in the stored frame 34 is used in future frames unless the local user attached to the expansion node 12 desires that the particular slot should contain new information, as explained in detail below.

If the expansion node 12 is in the process of transmitting, for example, the second frame 32 while the first frame 30 comes back to the expansion node 12 after having passed through the entire ring topology 10, the first frame 30, preferably, enters the FIFO queue 13 and must wait in the queue until the expansion node 12 has read and transmitted all the slots of the second frame 32. The start slot 1 of the second frame 32 is, preferably, generated exactly an integer value of 125 microseconds after the start slot 1 of the first frame 30 was generated by the expansion node 12 to maintain the synchronization of all the frames in the ring topology 10.

When the second frame 32 has been transmitted, the expansion node 12 may start to read the first slot in the stored frame 34. As indicated above, it should be noted that when each slot of the stored frame 34 is read by the expansion node 12, the expansion node, like any other node according to the DTM protocol, has the option of either using the same information that is stored in the particular slot of the stored frame 34 or change the information of a particular slot before the new frame is transmitted into the ring topology 10.

According to the DTM protocol, when each expansion node 12 and node 14 in the ring topology 10 reads the slots of a frame transmitted by or received from a preceding node, including the expansion node 12, the nodes may either copy the information of the slots and send the information to the local user of the particular node and transmit the same information to the next node in the ring topology 10. If slot reuse is used, the nodes 14 may also read and copy the information of the slots and forward the copied information to the local user and then change the information or write new information into the slots when the frame is forwarded to the next node.

Of course, the nodes may neither read or copy the information of a particular node. Preferably, no changes are made to the information of the slots while the stored frame 32 is in the FIFO queue 13. When the information contained in a set of particular slots are not changed by the expansion node 12, a node that is located before the expansion node 12 in the ring may send information to a node that is located after the expansion node 12 in the ring topology 10. The function of the expansion node 12 can therefore be analogous to the function of one of the other nodes 14 with the exception that the expansion node 12 may delay incoming cycle to make sure the synchronization is correct.

Between each frame that is transmitted by the expansion node 12, a couple of idle messages (referred to as gap slots 54 in FIG. 3) may be transmitted by the expansion node 12 to separate the frames from one another.

As noted above, one important feature of the present invention is that the cycle time of each frame are preferably constant to maintain the synchronization of the entire ring topology 10. Additionally each frame has a constant number of slots although each slot in every cycle may or may not contain any information. It is also important to note that it is possible to increase the capacity in the fiber optics 11 thereby increasing the number of slots per cycle without losing the synchronization of the ring topology 10 of the network. It is even possible to connect two DTM ring networks together even though they operates at different speeds and the synchronization may be maintained if the cycle time and slot length are constant.

As mentioned above, the expansion node 12 or any other node 14 in the ring topology 10 may create a channel by allocating a set of data slots for the channel to each node and by sending a channel establishment control message. The control message may be addressed either to a single node or to a multi-cast group and announces that the channel has been created and what slots are used.

A traditional circuit is often a point-to-point connection between a sender and a receiver. DTM, on the other hand, uses a shared medium which inherently supports multi-cast since a slot can be read by several nodes in a ring topology.

Access delay is the average time from the time that a request arrives to the node until the data transfer starts. It is a measure of the overhead of the channel establishment and includes the time it takes to allocate slots, send a channel establishment message to the receiver and send the first slot of data. In the multi-hop case, the sender waits for a confirmation from the receiver that the channel has been established on both ring topologies before it starts sending data. For the single hop case, the sender alone may create the channel to the receiver and can therefore start sending data as soon as the slots have been allocated.

The access delay consists, when there is a low load condition, mainly of the time it takes for a node to process the transfer request, waiting time for the first available control slot (for the channel establishment message) and then for the first data slot. When the load increases, the nodes have to request slots from other nodes and more delay may be introduced.

In each network node, there is a node controller which is a process/processor that executes the DTM control protocol to control the access to data slots and to perform network management operations such as network start-up and error recovery. Some of the tasks of the node controller are related to the DTM control protocol such as creating and terminating channels on demand from users and to manage network resources in response to user requests and in the background. In this way, the node controller may execute boot sequences and exchanges messages in the control slots.

Preferably, control slots are used exclusively for messages between node controllers. As mentioned earlier, each node controller has write access to at least one control slot in each cycle which it uses to broadcast control messages to downstreams nodes. Since write access to control slots is exclusive, the node controller always has access to its control slots regardless of other nodes and network load. The number of control slots a node uses may dynamically vary during network operation.

Preferably, the majority of the slots in a cycle are data slots. Access to data slots changes over time, according to traffic demands. Write access to data slots may be controlled by slot tokens (or tokens for short). A node controller may write data into a slot only if it owns the corresponding token. A token protocol guarantees the slot access to be conflict free which means that at most one node writes data into the same slot.

Control messages for the channel establishment and bandwidth reallocation may carry sets of tokens as parameters. However, a control message is, preferably, 64 bits and can therefore have only a small number of parameters. This means that if a user requests a large bandwidth transfer, it may be necessary to send several control messages to create the channel. This may introduce extra access delay and consumes signaling capacity. Several mechanisms have been considered to decrease the amount of information that needs to be sent during the channel creation and token reallocation. The first optimization in token management is to introduce block tokens. A block token may be transferred in a single control message and represents a group of tokens, but can only be used for particular combinations of tokens. For instance, a block token may be denoted by a slot number and an offset giving the number of contiguous slots in the group. The block token optimization assumes that the token pool is not fragmented into small pieces. An amount of small token blacks in the free pool may be a problem and will be referred to as fragmentation.

The token protocol guarantees that a data slot can never be used by two nodes simultaneously on the ring topology. Sometimes this protocol is too conservative. FIG. 6 shows an example of how three tokens (A, B, and C) are reserved for three channels. The nodes are connected by segments and channels typically use a subset of the segments on the ring structure (gray color) and the rest are reserved (white color) but left unused and thus wasting shared resources. A better alternative is to let the channels only reserve capacity on the segments between the sender and the receiver as the example illustrated in FIG. 7. A single slot may in this case be used multiple times on the ring topology. Channel D is using the same slots as channel E but on different segments. Similarly, channel F and channel G use the same slots but on different segments. This is referred to as slot reuse. Slot reuse enables simultaneous transmissions in the same slot over disjointed segments of the ring topology. Because the ring topology is round, it is also possible to reserve slots from the end segments to the start segment, such as from segment 16 to segment 2. This is an added feature of ring structures that is not available in single or dual straight bus topologies.

Slot reuse is a general method to better utilize shared links in ring and bus networks. The slot reuse methods in DQDB, Simple and CRMA depend on control information in the slots. Buffer insertion networks when combined with destination release as in meta-ring may reuse capacity of individual links and resolve eventual contention by delaying the incoming packet stream through an elastic buffer.

With slot reuse, the access scheme complexity may be increased regardless of whether it is done in hardware as in DQDB, Simple, and CRMA or in software, such as in DTM. When the slot reuse principle is implemented into systems other than DTM, the slot reuse also adds complex hardware to the critical high-speed path through a node and may therefore increase the node delay.

To allow slot reuse in DTM, the block token format should be extended to include parameters describing the segment(s) that the format is representing. The token management protocol may also be modified to avoid conflicts in the slot number dimension as well as the segment dimension. The most important assumption is that no hardware changes to the original prototype implementation should be required.

There are two main factors that influence utilization in DTM. First, each node is assigned signaling capacity in the form of control slots, which means that there are fewer slots available for data transfer on a ring with many nodes, given a fixed link capacity. Secondly, token reallocation incurs overhead since while a slot token is being reallocated between nodes, the corresponding slot cannot be used for data transfer.

While the present invention has been described with reference to preferred embodiments, it is to be understood that certain substitutions and alterations may be made thereto without departing from the spirit and scope of the invention as set forth in the appended claims.

We claim:

1. A method of synchronizing cyclical messages, the method comprising:

providing a ring topology having first, second, third and fourth nodes in operative engagement therewith, the ring topology having a capacity that is dividable into a number of time slots;

providing an expansion node in operative engagement with the ring topology, the expansion node being adapted to transmit frames into the ring topology, the expansion node having an expansion buffer in operative engagement therewith;

the expansion node transmitting a first frame into the ring topology at a first cycle time, the first frame comprising time slots;

the expansion buffer receiving the first frame at an arrival time, the arrival time being later than the first cycle time;

storing the first frame in the expansion buffer;

if the arrival time of the first frame is an integer multiple of the first cycle time then the expansion node reviewing the time slots of the first frame; and if the arrival time is not an integer value of the first cycle time then delaying the first frame a delay time until a total time of the arrival time in addition to the delay time is an integer multiple of the first cycle time then the expansion node reviewing the time slots of the first frame;

extending a first channel segment from the fourth node to the first node, the first channel segment using a first time slot;

extending a second channel segment from the second node to the third node so that the second channel segment is disjointed from the first channel segment, the second channel segment using the first time slot; and simultaneously transmitting information in the first time slot over the first and second disjointed segments.

2. The method according to claim 1 wherein the method further comprises transferring the first frame from the expansion buffer to a transmitting side of the expansion node and transmitting the first frame into the ring topology.

3. The method according to claim 2 wherein the method further comprises modifying the first frame prior to transmitting the first frame.

4. The method according to claim 1 wherein the method further comprises transmitting a first idle message at a first transmission time prior to the first cycle time, the first cycle time being the integer multiple later than the transmission time of the first idle message.

5. The method according to claim 4 wherein the method further comprises transmitting a second idle message at a second transmission time prior to the first cycle time, the first transmission time being the integer multiple later than the second transmission time.

6. The method according to claim 4 wherein the method further comprises transmitting the first idle message through the ring topology and the expansion node receiving the first idle message and removing the first idle message from the ring topology.

7. The method according to claim 6 wherein the method further comprises distinguishing the first idle message from the first frame.

8. The method according to claim 1 wherein the method further comprises storing only frames in the expansion buffer.

9. The method according to claim 1 wherein the method further comprises reading the time slots of the first frame prior to transmitting the first frame into the ring topology.

10. The method according to claim 1 wherein the method further comprises transmitting an idle message and transmitting a second frame after the step of transmitting the first frame.

11. A method for synchronizing cyclical frames in a circuit switched network having a capacity that is dividable into constant cycle times, the method comprising:

providing a ring topology comprising an expansion node and first, second, third and fourth nodes in operative engagement with the ring topology, the expansion node having a buffer section;

providing a plurality of idle messages;

providing a plurality of frames, the frames comprising data slots and a constant number of control slots;

transmitting the plurality of idle messages into the ring topology, each idle message being separated by at least one cycle time;

controlling the buffer section, if the buffer section contains a first idle message then transmitting a frame into the ring topology and if the buffer section contains no information then continuing to transmit idle messages into the ring topology;

extending a first channel segment from the fourth node to the first node, the first channel segment using a first time slot;

extending a second channel segment from the second node to the third node so that the second channel segment is disjointed from the first channel segment, the second channel segment using the first time slot; and simultaneously transmitting information in the first time slot over the first and second disjointed segments.

12. A dynamic synchronous transfer mode network, comprising:

a dynamic synchronous transfer node ring topology having a capacity that is dividable into control slots and data slots;

an expansion node in operative engagement with the ring topology, the expansion node comprising a first-in-first-out expansion queue and a slot selector serially connected to the first-in-first out expansion queue, the slot selector connected to a user access module and a transmission side of the expansion buffer;

a first, second, third and a fourth node in operative engagement with the ring topology;

a first channel segment extending from the fourth node to the first node, the first channel segment using a first time slot; and a second channel segment extending from the second node to the third node so that the second channel segment is disjointed from the first channel segment, the second channel segment using the first time slot, the first time slot being simultaneously transmittable over the first and second disjointed segments.

13. A circuit switched network, comprising:

a ring topology having a first nodes, a second node, a third node and a fourth node in operative engagement therewith;

an expansion node in operative engagement with the ring topology for transmitting idle messages and frames into the ring topology, the frames comprising a first frame having a plurality of data slots and a first control slot associated with the first node and a second control slot associated with the second node, a second frame having a plurality of data slots and a first control slot associated with the first node and a second control slot associated with the second node;

a buffer segment in operative engagement with the expansion node for receiving and storing the frames transmitted by the expansion node and for removing the idle messages from the ring topology;

a first channel segment extending from the fourth node to the first node, the first channel segment using a first time slot; and a second channel segment extending from the second node to the third node so that the second channel segment is disjointed from the first channel segment, the second channel segment using the first time slot, the first time slot being simultaneously transmittable over the first and second disjointed segments.

* * * * *